(12) United States Patent
Stumbo et al.

(10) Patent No.: US 7,665,714 B2
(45) Date of Patent: Feb. 23, 2010

(54) FAIL SAFE MECHANISM FOR VALVE USING A COCK AND LOCK RETURN SPRING

(75) Inventors: Steven Charles Stumbo, Fort Collins, CO (US); Doyle Kent Stewart, Fort Collins, CO (US); Jerry Kaminski, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 426 days.

(21) Appl. No.: 11/839,379

(22) Filed: Aug. 15, 2007

(65) Prior Publication Data
US 2009/0045365 A1 Feb. 19, 2009

(51) Int. Cl.
*F16K 31/44* (2006.01)
(52) U.S. Cl. .......................... 251/71; 251/69
(58) Field of Classification Search ............. 251/66, 251/68, 69, 70, 71, 101
See application file for complete search history.

(56) References Cited

U.S. PATENT DOCUMENTS

| 4,090,589 A | 5/1978 | Fitzwater |
| 4,113,063 A | 9/1978 | Troy |
| RE30,135 E | 11/1979 | Fitzwater et al. |
| 4,289,038 A | 9/1981 | Hore |
| 5,915,668 A | 6/1999 | Hodapp et al. |
| 6,276,664 B1 | 8/2001 | Keller |
| 6,431,317 B1 | 8/2002 | Coe |
| 6,572,076 B1 | 6/2003 | Appleford et al. |
| 7,182,310 B2 * | 2/2007 | Chen ............ 251/69 |
| 7,377,479 B1 * | 5/2008 | Chen ............ 251/69 |

FOREIGN PATENT DOCUMENTS

| JP | 51062421 A | 5/1976 |
| JP | 54161117 A | 12/1979 |

* cited by examiner

*Primary Examiner*—John K Fristoe, Jr.
(74) *Attorney, Agent, or Firm*—Reinhart Boerner Van Deuren P.C.

(57) ABSTRACT

A fail safe mechanism having a return member, valve stem extension, energy storage member, and locking assembly. The valve stem extension is driven by an electrical actuator and configured to drive the return member in a first direction and to be driven by the return member in a second direction. The energy storage member is configured to store energy when the electrical actuator causes the valve stem extension to drive the return member in the first direction and to release the energy stored therein when a disruption of power causes the return member to drive the valve stem extension in the second direction. The locking assembly is configured to hold the return member in a cocked position such that the valve stem extension rotates with the valve independently of the return member and free of influence from the energy storage member while the power is applied to the electrical actuator.

20 Claims, 2 Drawing Sheets

FAIL SAFE MECHANISM FOR VALVE USING A COCK AND LOCK RETURN SPRING

BACKGROUND

The mechanism generally relates to electrically-actuated valve systems and, more particularly, to electrically-actuated valve systems having a fail safe feature.

Electrically-actuated valves may be used to control and meter the flow of a fluid (e.g., a gas or liquid). In some circumstances, these electrically-actuated valves include fail safe systems as disclosed in, for example, U.S. Pat. Nos. 6,572,076, 6,431,317, 6,276,664, 5,915,668, 4,289,038, RE30,135, 4,113,063, and 4,090,589.

BRIEF SUMMARY OF THE INVENTION

The fail safe mechanism for a valve is provided. During operation, the fail safe mechanism is first driven to an energy storage position whereby the mechanism is held in place. The valve is then operable without having to also drive the fail safe mechanism, resulting in reduced drive power requirements during normal operation. Upon disruption of power, the fail safe mechanism is released and drives the valve to its fail safe position.

In one embodiment, the fail safe mechanism for the valve is positioned by an electrical actuator. The fail safe mechanism includes a first disk, a second disk, an energy storage member, and a locking assembly. The second disk is operably coupled to and driven by the electrical actuator. The second disk is also configured to drive the first disk in a first direction and be driven by the first disk in a second direction. The energy storage member is operably coupled between the first disk and an anchor point. The energy storage member is also configured to store energy when the electrical actuator causes the second disk to drive the first disk in the first direction and to release the energy stored therein to permit the first disk to drive the second disk in the second direction. The locking assembly is configured to hold the first disk in a cocked position such that the second disk is permitted to rotate independently of the first disk and free of influence from the energy storage member.

In another embodiment, a fail safe mechanism for a valve driven into and between open and closed positions by an electrical actuator is provided. The fail safe mechanism includes a mounting plate, a coupled disk, a segmented disk, an energy storage member, and a locking mechanism. The coupled disk is rotatable relative to the mounting plate and rotatably driven by the electrical actuator. The segmented disk is selectively engageable with the coupled disk and rotatably driven by the coupled disk when engaged therewith. The energy storage member is operably coupled to the segmented disk and the mounting plate. The energy storage member stores energy when the segmented disk is rotatably driven by the electrical actuator through the coupled disk toward a cocked position. The locking assembly is mounted to the mounting plate. The locking assembly locks the segmented disk in the cocked position until the electrical actuator experiences a disruption in power.

In yet another embodiment, a fail safe mechanism for a valve rotatably driven into and between open and closed positions by an actuator is provided. The fail safe mechanism includes a mounting plate, a coupled disk, a segmented disk, an energy storage member, and a locking assembly. The coupled disk is rotatable relative to the mounting plate and rotatably driven by the actuator. The segmented disk is selectively engageable with the coupled disk and rotatably driven by the coupled disk when engaged thereto. The energy storage member is operably coupled to the segmented disk and the mounting plate. The energy storage member stores energy when the segmented disk is rotatably driven by the coupled disk toward a cocked position. The locking assembly is mounted to the mounting plate. The locking assembly is configured to releasably lock the segmented disk in the cocked position. As such, the actuator is free to rotatably drive the valve into and between the open and closed positions without interference from the energy storage member. The locking assembly is also configured to release the segmented disk from the cocked position upon a disruption of power to the actuator.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the fail safe mechanism will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

A fail safe mechanism for a valve is provided. During operation, the fail safe mechanism is first driven to an energy storage position whereby the mechanism is held in place. The valve is then operable without having to also drive the fail safe mechanism, resulting in reduced drive power requirements during normal operation. Upon a disruption of power, the fail safe mechanism is released and drives the valve to the fail safe position.

Figure 1:
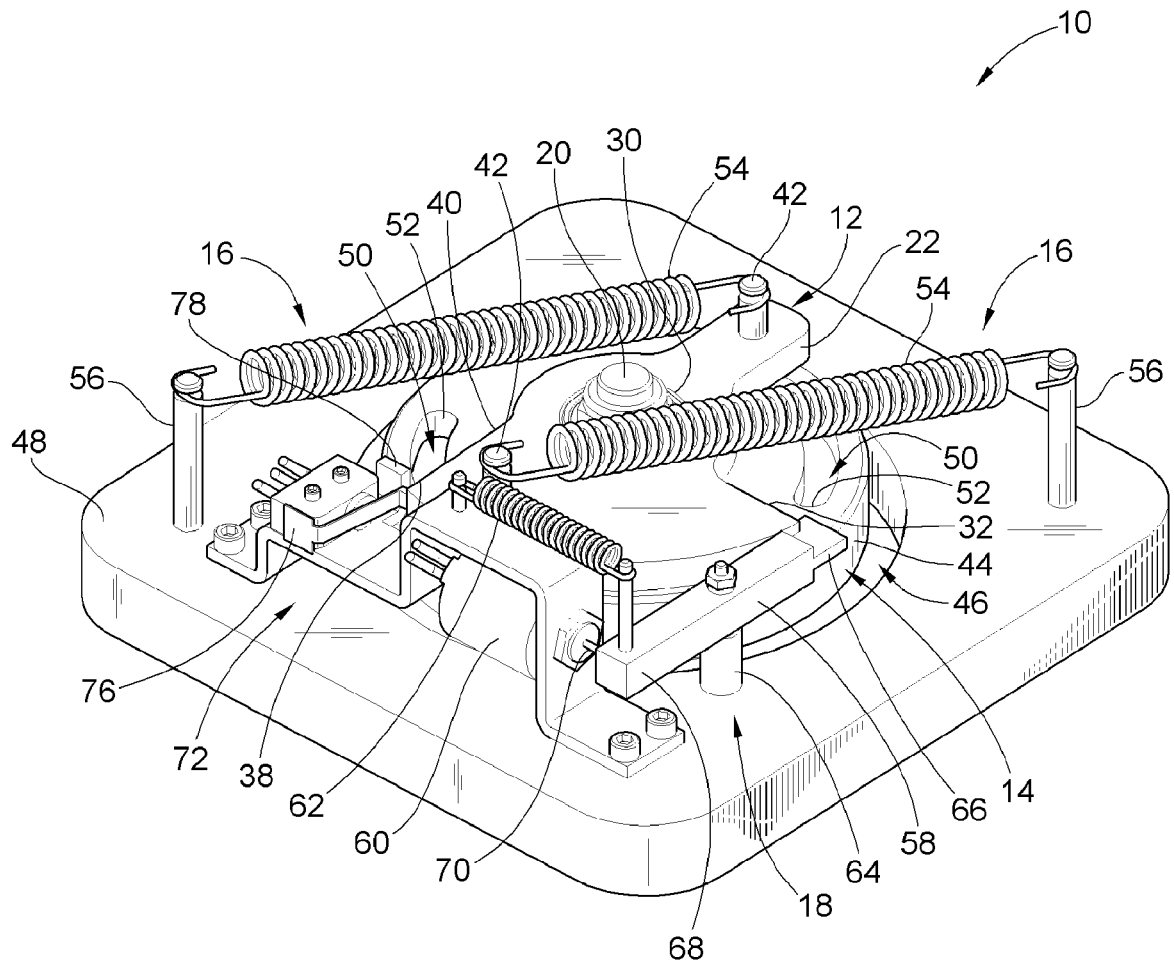
FIG. 1 is a perspective view of an exemplary embodiment of a fail safe mechanism in accordance with the teachings of the present invention.

Referring now to FIG. 1, a fail safe mechanism 10 is illustrated. In the description that follows, the fail safe mechanism 10 shall be described for use with an electrically-actuated valve used to meter a fluid (e.g., gas, liquid). However, other fail safe mechanisms may also be used in other applications where valves are used. As will be more fully explained below, the fail safe mechanism 10 permits the electrically-actuated valve to operate efficiently and safely. As shown in FIG. 1, the fail safe mechanism comprises a segmented disk 12 (e.g., a return member), a coupled disk 14 (e.g., a valve stem extension), an energy storage member 16, and a locking assembly 18.

The segmented disk 12 in FIG. 1 is mounted via a bearing onto a valve stem 20 from, for example, an electrically-actuated valve. As used herein, the electrically-actuated valve may be actuated by an electrical actuator or an electro-hydraulic actuator (collectively referred to as an "electrical actuator"). The segmented disk 12 is able to freely rotate about the valve stem 20 in either the clockwise or counter-clockwise direction, unless restricted from movement as explained below. In the illustrated embodiment of FIG. 2, the segmented disk 12 has a non-circular periphery 22 when viewed from above. In particular, the segmented disk 12 includes an arcuate portion 24 and an elongate portion 26 on opposing sides of a central portion 28.

The central portion 28 of the segmented disk 12 includes a central aperture 30 through which the valve stem 20 of the valve passes. The arcuate portion 24 includes a shoulder 32 generally defined by an intersection of an arcuate side wall 34 and a radially-inwardly extending side wall 36. The arcuate portion 24 also defines an abutment 38 formed by a portion of another radially extending side wall 40. As shown in the illustrated embodiment of FIG. 2, the shoulder 32 and abutment 38 are generally spaced apart from each other around the periphery 22 by about ninety degrees. As such, the side walls 36, 40 are generally perpendicular to each other. Nonetheless, other orientations and configurations are possible.

On each of the elongate portion 26 and the arcuate portion 24, the segmented disk 12 supports a engagement pin 42. In the illustrated embodiment, the engagement pin 42 is a single pin passing entirely through the segmented disk 12 and projecting away from both the top and bottom surfaces of the segmented disk 12. Despite the engagement pin 42 being depicted as a single pin, the engagement pin may have other suitable configurations. For example, the engagement pin 42 may be divided into top and bottom sections that are independently secured to the top and bottom surfaces of the segmented disk 12, respectively. If desired, the top and bottom sections may be axially aligned with each other or offset from each other.

As oriented in FIG. 1, the coupled disk 14 is situated below the segmented disk 12. In the illustrated embodiment of FIG. 1, the coupled disk 14 has a circular periphery 44 and also includes a central aperture through which the valve stem 20 of the valve passes. When mounted on the valve stem 20, the coupled disk 14 and the segmented disk 12 are generally co-axial with each other. While the segmented disk 12 is able to freely rotate about the valve stem 20, the coupled disk 14 is not. The coupled disk 14 is coupled to the valve stem 20 and, as such, rotates therewith. When the electrical actuator is driving the valve between open and closed positions, the valve stem 20 drives the coupled disk 14 in either a generally clockwise or counterclockwise direction as oriented in the figures.

In the illustrated embodiment of FIG. 1, both the coupled disk 14 and the segmented disk 12 are situated within a central opening 46 in a mounting plate 48. Depending on the particular configuration of the valve, the mounting plate 48 may be a component of the fail safe mechanism 10 enclosed inside the valve or a portion of the housing disposed around the valve. As shown, the coupled disk 14 and the segmented disk 12 are generally co-planar with the mounting plate 48. The mounting plate 48 may be formed in a variety of suitable shapes. In addition, like the segmented disk 12 and the coupled disk 14, the mounting plate 48 may be constructed of one or more different materials.

As shown, the coupled disk 14 includes channels 50 (i.e., grooves) extending below the top surface of the coupled disk 14. The channels 50 may be machined or otherwise suitably formed in the coupled disk 14. The channels 50 are generally disposed on opposing sides of the coupled disk 14 and adjacent the periphery 44 thereof. As will be more fully explained below, the length of each channel 50 generally corresponds to at least the amount of rotation required to transition the valve from an open to a closed position, and vice versa.

An interface portion of each of the engagement pins 42 extends downwardly into one of the channels 50. As will be more fully explained below, at times the interface portion of the engagement pins 42 on the segmented disk 12 are permitted to move and travel through the channels 50 of the coupled disk 14. When this occurs, the coupled disk 14 is free to rotate independently of the segmented disk 12. However, at other times, the interface portion of the engagement pins 42 engage an end wall 52 of the channels 50. When this occurs, the coupled disk 14 and the segmented disk 12 are engaged with each other and generally rotate together in one direction or another.

In the illustrated embodiment of FIG. 1, the energy storage member 16 is constructed from a plurality of extension springs 54. One end of the extension springs 54 is coupled to an upwardly projecting portion of one of the engagement pins 42. The other end of the extension springs 54 is coupled to an anchor 56 secured to the mounting plate 48. In those embodiments where the mounting plate 48 is formed from a portion of the housing of the valve, the other end of each extension springs 54 are simply anchored to an appropriate portion of the housing.

In FIG. 1, the extension springs 54 are shown in an extended or stretched state. Therefore, each extension spring 54 contains stored energy which, as will be more fully explained below, may be released. While in their expanded state, the extension springs 54 generally bias the segmented disk 12 toward counterclockwise rotation. The pulling force of the extension springs 54 encourages the segmented disk 12 to rotate such that the springs move to an unextended state. However, in the state shown in FIG. 1, the segmented disk 12 is held in place and prevented from rotating by the locking assembly 18.

In the illustrated embodiment of FIG. 1, the locking assembly 18 generally includes a lever arm 58, an electric solenoid 60, and a solenoid return spring 62. The lever arm 58 is pivotally mounted on a pivot post 64 projecting from the mounting plate 48. The lever arm 58 includes ends 66, 68 on opposing sides thereof. One of the ends 66 is configured to engage with the shoulder 32 of the segmented disk 12. When the end 32 is engaged with the shoulder 32, the segmented disk 12 is prevented from rotating in a counterclockwise direction despite the pull of the extension springs 54. The other end 68 of the lever arm 58 is positioned to engage with an armature 70 of the electric solenoid 60.

The electric solenoid 60 is operably coupled to the mounting plate 48. In the illustrated embodiment of FIG. 1, the electric solenoid 60 is anchored by a bracket assembly 72. As shown, the bracket assembly 72 is secured to the mounting plate 48 through suitable connectors (e.g., screws, rivets, bolts, etc.). Both the bracket assembly 72 and the lever arm 58 include an upwardly projecting mount 74. The solenoid return spring 62 is operably coupled to, and generally extends between, these mounts 74. When the armature 70 of the electric solenoid 60 is extended as shown in FIG. 1, the solenoid return spring 62 is stretched. As a result, the solenoid return spring 62 attempts to draw the end 68 of the lever arm 58 toward the electric solenoid 60. However, the extended armature 70 of the electric solenoid prevents that from occurring. If, however, the armature 70 of the electric solenoid 60 is not extended, the solenoid return spring 62 is able to drawn the end 68 of the lever arm 58 toward the electric solenoid 60.

Figure 2:
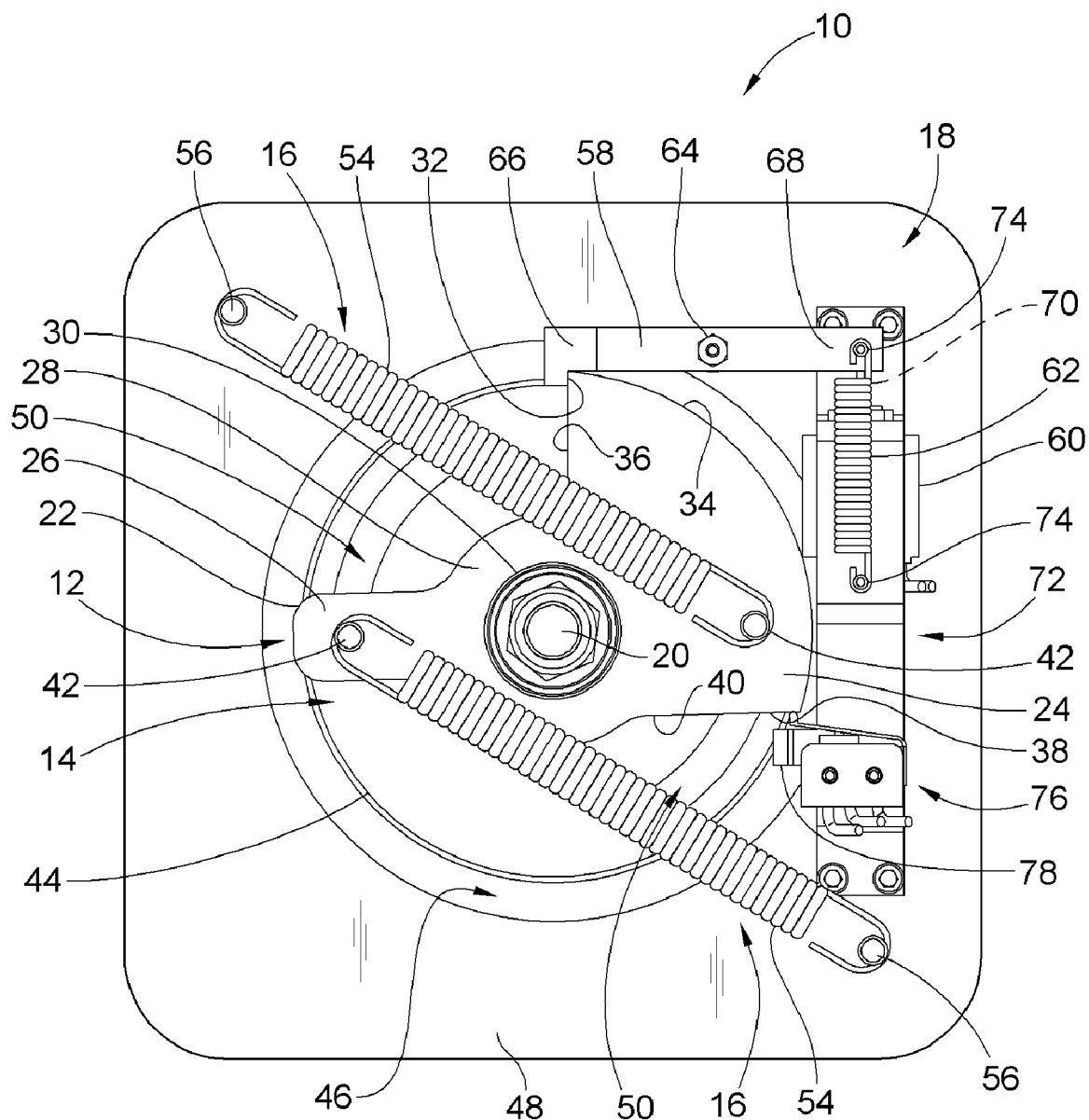
FIG. 2 is a plan view of the fail safe mechanism of FIG. 1.

In FIGS. 1 and 2, the locking assembly 18 further includes a position switch 76 and a stop tab 78. In the illustrated embodiment of FIGS. 1 and 2, the position switch 76 and the stop tab 78 are mounted on the bracket assembly 72. However, in other embodiments, the position switch 76 and the stop tab 78 may be coupled directly to the mounting plate 48 or secured to the housing of the valve associated with the fail safe mechanism 10.

An arm of the position switch 76 generally projects inwardly into the central opening 46 of the mounting plate 48 such that, when the segmented disk 12 is sufficiently rotated, the arm of the position switch is impacted by the abutment 38 and the position switch is triggered. When the position switch 76 is triggered, the position of the segmented disk 12 and, correspondingly, the position of the valve are known. In the illustrated embodiment of FIGS. 1 and 2, when the abutment 38 of the segmented disk 12 has triggered the arm of the position switch 76, the valve is generally in or near the fully open position. However, in another embodiment the valve may be in or near a fully closed position.

The stop tab 78 projects inwardly into the central opening 46 of the mounting plate 48 and is able to interfere with the rotation of the segmented disk 12. For example, the stop tab 78 prevents the segmented disk 12 from over rotating in a clockwise direction (i.e., rotating over center) by engaging the abutment 38. The stop tab 78 also prevents the extension springs 54 from interfering with each other. The stop tab 78 does not, as shown in FIGS. 1 and 2, interfere with the rotation of the coupled disk 14.

In operation, when the electrically-actuated valve incorporating the fail safe mechanism 10 is energized, the electrical actuator drives the coupled disk 14, via the valve stem 20, in a clockwise direction. As the coupled disk 14 rotates, the end wall 52 of the arcuate groove 50 engages the engagement pin 42 on the segmented disk 12 projecting into the arcuate groove. Due to this engagement, the coupled disk 14 drives the segmented disk in the clockwise direction. Because the extension springs 54 are coupled to the segmented disk and anchored to the mounting plate 48, the extension springs 54 are stretched and store energy as the segmented disk 12 continues to rotate.

The segmented disk 12 is rotated until the valve is in a fully open position (or fully closed position, depending on the valve configuration) and the abutment 38 engages the position switch 76 and, in one embodiment, the stop tab 78. At this time, the electric solenoid 60 is activated. The activated electric solenoid 60 extends the armature, overcoming the bias of the solenoid return spring 62, until the end 68 of the lever arm 58 is pushed away from the electric solenoid. As the lever arm 58 pivots, the other end 66 of the lever arm 58 catches the shoulder 32 of the segmented disk 12 and holds the segmented disk in a "cocked" position as shown in FIGS. 1 and 2. While the segmented disk 12 is held in the cocked position, the energy imparted to the extension springs 54 during rotation of the segmented disk 12 is retained.

After the segmented disk 12 has been cocked, the coupled disk 14 moves in both the clockwise and counterclockwise directions along with the valve stem 20 as the valve is operated. As the coupled disk 14 rotates, the pins 42 on the segmented disk 12 travels back and forth within the channels 50. Therefore, the coupled disk 14 is able to rotate independently of the segmented disk 12. The coupled disk 14 is also free of the influence of the extension springs 54 because the segmented disk 12 is held in the cocked position by the locking assembly 18. As a result, a smaller electrical actuator, which costs less and consumes less power, may be used to drive the valve (and coupled disk 12) during normal valve operation.

Upon a disruption in power to the electrical actuator driving the valve (and/or the electric solenoid 60), the locking assembly 18 releases the segmented disk 12. In particular, the armature 70 of the electric solenoid 60 is retracted. When this occurs, the solenoid return spring 62 pulls the end 68 of the lever arm 58 toward the electric solenoid 60, the lever arm 58 pivots in response, and the end 66 of the lever arm 58 disengages from the shoulder 32 of the segmented disk 12. As used herein, a disruption of power may be a very brief loss of power or the loss of power for a more substantial duration of time.

When the segmented disk 12 has been disengaged by the locking assembly 18, the extension springs 54 contract and release the stored energy. As a result, the extension springs 54 force the segmented disk 12 to rotate in a counterclockwise direction. As the segmented disk 12 rotates, the engagement pins 42 travel through the channels 50 in the coupled disk 14 until they engage an end wall 52 of the channel. Thereafter, due to the pin 42 and end wall 52 interaction, the segmented disk 12 drives the coupled disk 14 in the counterclockwise direction as the stored energy of the extension springs 54 drives the springs to their contracted (i.e., un-extended) state. Because the coupled disk 14 is secured to the valve stem 20, the valve is correspondingly driven into the fail safe position (e.g., a closed position where the flow of fluid therethrough is inhibited or prevented).

Once power is restored to the electrically-actuated valve, the electrical actuator is able to once again place the fail safe mechanism 10, and in particular drive the segmented disk 12, into the locked position as described above. Thereafter, the valve is able to operate without opposition from the extensions springs 54, resulting in less power needed to drive the valve, or alternatively drive the valve at a faster rate with the same power draw. As can be seen from the foregoing, the fail safe mechanism 10 permits a valve to operate with a smaller electrical actuator that costs less and requires less power to operate during normal operation.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fail safe mechanism for a valve having a fail safe position and positioned by an electrical actuator, comprising:
   a return member;
   a valve stem extension operably coupled to the valve and driven by the electrical actuator, the valve stem extension configured to drive the return member in a first direction toward a cocked position and to be driven by the return member in a second direction thereby moving the valve toward the fail safe position;
   an energy storage member operably coupled between the return member and an anchor, the energy storage member configured to store energy when the electrical actuator causes the valve stem extension to drive the return member in the first direction and to release the energy stored therein when a disruption of power causes the return member to drive the valve stem extension and the valve in the second direction; and
   a locking assembly configured to hold the return member in the cocked position such that the valve stem extension rotates with the valve independently of the return member and free of influence from the energy storage member while power is applied to the electrical actuator.

2. The fail safe mechanism of claim 1, wherein the locking assembly is configured to release the first member from the cocked position upon the disruption of the power.

3. The fail safe mechanism of claim 1, wherein the return member and the valve stem extension are engaged with each other through a groove and pin interaction, and wherein the energy storage member comprises a plurality of elongate extension springs.

4. The fail safe mechanism of claim 1, wherein the fail safe mechanism further includes a mounting plate, the mounting plate planar with the return member and the valve stem extension and providing the anchor.

5. The fail safe mechanism of claim 1, wherein the energy storage member is an elongate extension spring, the elongate extension spring configured to be stretched as the first member moves toward the cocked position.

6. The fail safe mechanism of claim 1, wherein the first member is a first disk having a non-circular periphery and the valve stem extension is a second disk having a circular periphery.

7. The fail safe mechanism of claim 1, wherein the locking assembly includes an electric solenoid.

8. The fail safe mechanism of claim 7, wherein the locking assembly includes a lever pivot arm and a return spring, the return spring biasing one end of the lever pivot arm toward the electric solenoid.

9. The fail safe mechanism of claim 7, wherein the fail safe mechanism further includes a bracket assembly supporting the electric solenoid, the bracket assembly including a stop tab preventing the first member from rotating past the cocked position and a position switch identifying a maximum stop of the valve.

10. A fail safe mechanism for a valve having a valve stem driven into and between open and closed positions by an electrical actuator, comprising:
    a mounting plate;
    a coupled disk rotatable relative to the mounting plate and operably connected to the valve stem, the coupled disk rotatably driven by the electrical actuator;
    a segmented disk selectively engageable with the coupled disk, the segmented disk rotatably driven by the coupled disk when engaged therewith;
    an energy storage member operably coupled to the segmented disk and the mounting plate, the energy storage member storing energy when the segmented disk is rotatably driven by the electrical actuator through the coupled disk toward a cocked position;
    a locking assembly mounted to the mounting plate, the locking assembly locking the segmented disk in the cocked position until the electrical actuator experiences a disruption in power; and the valve stem rotates with the valve interpedently of the segmented disk and free of influence from the energy storage member while power is applied to the electrical actuator.

11. The fail safe mechanism of claim 10, wherein the locking assembly is configured to release the segmented disk from the cocked position upon the disruption in the power.

12. The fail safe mechanism of claim 11, wherein the segmented plate is able to engage and rotatably drive the coupled disk using the energy stored in the energy storage device when the segmented plate is released from the cocked position.

13. The fail safe mechanism of claim 12, wherein the coupled disk is able to drive the valve into a fail safe position when driven by the segmented disk.

14. The fail safe mechanism of claim 10, wherein the coupled disk rotates independently of the segmented disk after the segmented disk has been locked in the cocked position.

15. The fail safe mechanism of claim 10, wherein the coupled disk rotates independently of the segmented disk when the segmented disk is in the cocked position.

16. A fail safe mechanism for a valve rotatably driven into and between open and closed positions by an actuator, comprising:
    a mounting plate;
    a coupled disk rotatable relative to the mounting plate, the coupled disk rotatably driven by the actuator;
    a segmented disk selectively engageable with the coupled disk, the segmented disk rotatably driven by the coupled disk when engaged thereto;
    an energy storage member operably coupled to the segmented disk and the mounting plate, the energy storage member storing energy when the segmented disk is rotatably driven by the coupled disk toward a cocked position;
    a locking assembly mounted to the mounting plate, the locking assembly configured:
        to releasably lock the segmented disk in the cocked position such that the actuator is free to rotatably drive the valve into and between the open and closed positions without interference from the energy storage member, and
        to release the segmented disk from the cocked position upon a disruption of power to the actuator to drive the valve to a fail safe position.

17. The fail safe mechanism of claim 16, wherein the locking assembly is configured to releasably lock the segmented disk in the cocked position such that the coupled disk is able to rotate free of the segmented disk; and wherein the energy in the energy storage member is employed to drive the segmented disk away from the cocked position when the disruption of power is experienced and the locking member has released the segmented disk from the cocked position, the segmented disk in turn driving the coupled disk to drive the valve to the fail safe position.

18. The fail safe mechanism of claim 16, wherein the coupled disk has an arcuate channel formed into a top surface along a periphery and the segmented disk includes a pin extending into the arcuate channel.

19. The fail safe mechanism of claim 18, wherein first and second portions of the pin project from generally opposing sides of the segmented disk, the first portion of the pin operably coupled to the energy storage member, the second portion of the pin traveling through the arcuate channel and engageable with an end wall of the arcuate channel.

20. The fail safe mechanism of claim 19, wherein the mounting plate is disposed within the valve.

* * * * *